United States Patent [19]

French

[11] 4,010,030

[45] Mar. 1, 1977

[54] REMOVAL OF ARSENIC, ANTIMONY AND BISMUTH FROM MOLTEN COPPER WITH SULFUR HEXAFLUORIDE

[75] Inventor: Robert O. French, Salt Lake City, Utah

[73] Assignee: Kennecott Copper Corporation, New York, N.Y.

[22] Filed: Sept. 8, 1975

[21] Appl. No.: 611,154

[52] U.S. Cl. .................................. 75/76; 75/69; 75/70; 75/93 E
[51] Int. Cl.² .................................. C22B 15/00
[58] Field of Search ............ 75/76, 74, 72, 69, 7 P, 75/93 E, 63

[56] References Cited

UNITED STATES PATENTS

| | | | |
|---|---|---|---|
| 1,778,292 | 10/1930 | Donahue | 75/70 |
| 1,809,871 | 6/1931 | Smith | 75/70 |
| 3,490,897 | 1/1970 | Dore et al. | 75/76 |
| 3,619,177 | 11/1971 | Beck et al. | 75/76 |
| 3,767,383 | 11/1971 | Bell et al. | 75/76 |

*Primary Examiner*—Walter R. Satterfield
*Attorney, Agent, or Firm*—Mallinckrodt & Mallinckrodt

[57] ABSTRACT

Bismuth, antimony, and arsenic impurities are removed from molten copper by contacting such molten copper with sulfur hexafluoride gas, which reacts directly with the specified impurities to form gaseous fluorides.

6 Claims, 1 Drawing Figure

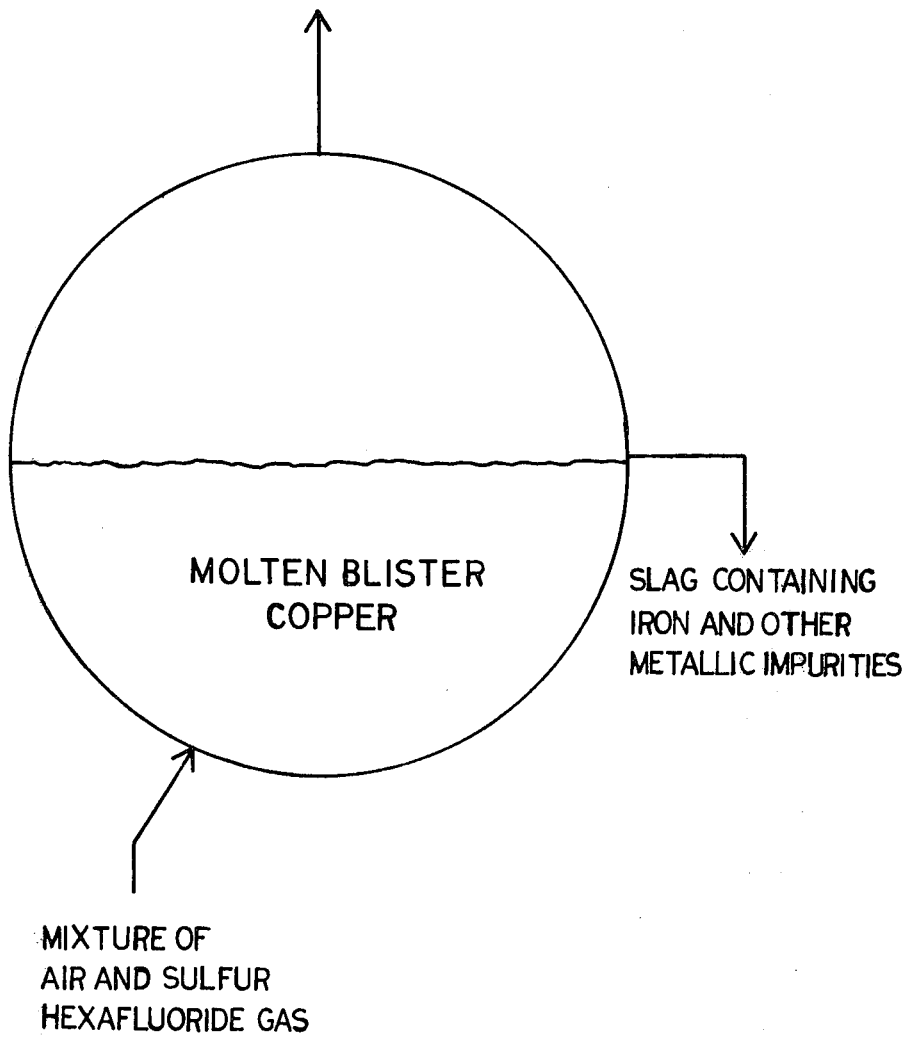

REMOVAL OF ARSENIC, ANTIMONY AND BISMUTH FROM MOLTEN COPPER WITH SULFUR HEXAFLUORIDE

BACKGROUND OF THE INVENTION

1. Field

The invention is in the field of processes for removing metallic impurities from molten copper.

2. State of the Art

Refining of metallic copper from an impure state is accomplished conventionally by either fire-refining or electrolytic refining. Fire-refining is capable of removing substantially all the sulfur, zinc, tin, and iron impurities from copper, but bismuth, antimony, and arsenic impurities are only partially removed. At best, the latter impurities can be reduced to concentrations of only about 100 ppm (parts per million) in the molten copper by conventional fire-refining. It is possible to further reduce the level of these impurities by electrolytic refining. However, such additional processing is economically feasible only when the fire-refined copper contains other precious metals in sufficient amounts so that the recovery thereof offsets the expense of the electrolytic refining step.

Attempts have been made to develop an economical method of reducing the levels of bismuth, antimony, and arsenic during or in conjunction with the conventional steps employed in the fire-refining of impure copper. For example, it has been proposed to contact the molten copper resulting from conventional fire-refining techniques with a molten salt phase comprising copper fluoride, whereby residual metallic impurities in the molten copper phase are transferred to the salt phase. The molten salt phase can be brought into direct contact with the molten copper, or a material can be added to the molten copper which forms the salt phase in situ.

A process for removing gaseous and metallic impurities from copper base alloys is disclosed in U.S. Pat. No. 3,434,825 wherein a gaseous, monomeric, halogen-containing, lower aliphatic hydrocarbon having at least one fluoride atom, is bubbled through the molten copper base alloy. As the fluorine-containing hydrocarbon passes into the melt, it thermally decomposes and the fluorine preferentially reacts with impurities, such as aluminum, iron, chromium, etc. to form insoluble fluorides which separate from the melt by gravity. Unfortunately, the process of U.S. Pat. No. 3,434,825 is ineffective in removing bismuth, antimony, and arsenic from molten copper.

SUMMARY OF THE INVENTION

In accordance with the invention, bismuth, antimony, and arsenic impurities are readily removed from molten copper by blowing gaseous sulfur hexafluoride thereinto. Sulfur hexafluoride is a non-toxic, innocuous, inexpensive, and readily available gas which has been found to rapidly react directly with bismuth, antimony, and arsenic impurities in the molten copper. These impurities are converted to gaseous fluorides, which readily separate from the molten copper. The process is simple, effective and inexpensive.

Any sulfur contamination of the molten copper which may result from the sulfur hexafluoride treatment can be prevented by blowing an oxygen-containing gas through the molten copper simultaneously with the blowing of the sulfur hexafluoride therethrough. Alternately, the blowing of an oxygen-containing gas through the molten copper can be done following the sulfur hexafluoride treatment. In the latter instance, any sulfur contamination resulting from the sulfur hexafluoride treatment is readily removed subsequently to the contamination by blowing with an oxygen-containing gas. The oxygen-containing gas can be air, a mixture of air and oxygen, and/or a mixture of oxygen and an inert gas, such as nitrogen.

The sulfur hexafluoride treatment can advantageously be incorporated in the conventional process of fire-refining blister copper. In such instances, the sulfur hexafluoride is simply added to the oxygen-containing gas which is blown through the molten copper during the conventional fire-refining process. The bismuth, antimony, and arsenic impurities can be reduced from hundreds of ppm to about 10 ppm during the air-blow stage of fire-refining.

THE DRAWING

An embodiment of the process representing the best mode presently contemplated of carrying out the invention is illustrated in the accompanying drawing, in which the single FIGURE is a flowsheet showing the invention applied as a part of the conventional fire-refining of blister copper.

DETAILED DESCRIPTION OF THE ILLUSTRATED EMBODIMENT

In accordance with the process of this invention, bismuth, arsenic, and antimony impurities are readily removed from impure copper containing these impurities by contacting the impure copper while in a molten state with gaseous sulfur hexafluoride. The sulfur hexafluoride reacts directly with bismuth, arsenic, and antimony contaminants in the molten copper, thereby converting the impurities to gasous fluorides which are expelled from the molten copper.

The sulfur hexafluoride gas is preferably introduced beneath the surface of the molten copper and allowed to bubble therethrough. The amount of sulfur hexafluoride brought into contact with the molten copper is at least the stoichiometric amount necessary for reacting with the bismuth, arsenic, and antimony impurities contained in the molten copper. An excess of the stoichiometric is preferable, usually from 50 to 100 percent excess. Substantially pure sulfur hexafluoride gas can be used or it can be mixed with other gases which are not detrimental to the molten copper. Inert gases such as nitrogen and carbon dioxide can be mixed with the sulfur hexafluoride in any proportion, and the mixed gases are then brought into contact with the molten copper.

It has been found advantageous to mix air or oxygen-enriched air with the sulfur hexafluoride gas. The oxygen content of the gas prevents any sulfur contamination of the molten copper due to sulfur introduced thereinto by the sulfur hexafluoride. Alternately, the molten copper can be contacted with air or oxygen-enriched air subsequent to the contact thereof with sulfur hexafluoride, to remove any sulfur contamination of the molten copper which occurred during the sulfur hexafluoride treatment.

Any means for injecting the sulfur hexafluoride gas or mixed gases thereof into the molten copper can be used. It is possible, for example, to use tuyeres, lances, or porous refractories. If a porous refractory is used, care must be taken to prevent the pores of the refractory from becoming clogged when the gas is not being injected into the bath.

The rate of delivery of sulfur hexafluoride to the molten copper is not critical, and can be varied in accordance with several factors, including the time available for the sulfur hexafluoride contact, the quantity of molten copper to be treated, and the amount of impurities in the copper. For example, a large copper charge containing significant amounts of impurities will require a higher rate of delivery of sulfur hexafluoride to remove the impurities in the same time as would be required to remove a smaller concentration of impurities in the same quantity of copper.

It can be advantageous to inject the sulfur hexafluoride containing gas into the bath with sufficient velocity to agitate the molten copper, and to force the copper to erupt into the atmosphere above the surface of the bath. Additional copper is thereby exposed to the sulfur hexafluoride gas above the surface of the bath.

The sulfur hexafluoride treatment can be readily accomplished simultaneously with the oxidizing air-blow step in the conventional process of fire-refining of blister copper. As shown in the drawing, a mixture of air and sulfur hexafluoride gas is injected into a bath of molten blister copper beneath the surface thereof. As the gas mixture passes through the molten bath, the oxygen contained therein oxidize substantially all the sulfur, zinc, tin, and iron impurities, and the oxidized impurities are either slagged from the molten copper or are separated therefrom as a volatile, gaseous compound. Simultaneously, the sulfur hexafluoride contained in the gas mixture reacts directly with bismuth, antimony, and arsenic impurities in the molten copper, converting these impurities to volatile metal fluorides which are removed from the bath with other effluent gases. Sulfur introduced into the molten bath by the sulfur hexafluoride is oxidized by the oxygen in the gas mixture and is removed from the bath in the effluent gases.

The following examples typify the invention. They are presented for purposes of illustration only and are not intended to limit the scope of the invention.

EXAMPLE I

Sulfur hexafluoride gas was passed through 100 pounds of molten copper containing 0.4% arsenic, 800 ppm of antimony, and 290 ppm of bismuth. The amount of sulfur hexafluoride used was 50 percent in excess of the stoichiometric amount for reacting with the impurities in the molten copper charge. The sulfur hexafluoride was introduced as a stream below the surface of the molten copper at a constant rate over a period of 30 minutes. There was no copper fluoride formed nor was any separate salt phase created.

At the end of the 30 minutes' treatment, a sample of the molten copper was analyzed and the results of such analysis are shown in Table 1.

Table 1

|    | Impurities in Copper at Beginning of Treatment | Impurities in Copper After Treatment |
|----|----|----|
| As | 0.48% | 0.17% |
| Sb | 800 ppm | 120 ppm |
| Bi | 290 ppm | 220 ppm |

EXAMPLE II

The procedure of Example 1 was repeated on 100 pounds of molten copper which initially contained 500 ppm of bismuth, 2 ppm of arsenic, and 3 ppm of antimony. The results of the sulfur hexafluoride treatment are shown in Table 2.

Table 2

|    | Impurities in Copper at Beginning of Treatment | Impurities in Copper After Treatment |
|----|----|----|
| Bi | 500 ppm | 30 ppm |
| Sb | 3 ppm | Not measured |
| As | 2 ppm | Not measured |

EXAMPLE III

The procedure of Example I was repeated with the exception that carbon tetrafluoride gas and dichlorodifluoromethane gas were substituted for the sulfur hexafluoride. Neither the carbon tetrafluoride gas or the dichlorodifluoromethane gas was effective in removing bismuth, antimony, or arsenic from the molten copper.

I claim:
1. A process for removing impurities selected from the group consisting of bismuth, antimony, arsenic, and mixtures thereof from molten copper, comprising contacting said molten copper with sulfur hexafluoride gas; forming gaseous fluorides of said impurities; and discharging said gaseous fluorides from said copper while it is still molten.
2. A process in accordance with claim 1, wherein sulfur introduced into the molten copper by the sulfur hexafluoride is removed by contacting the molten copper with an oxygen-containing gas.
3. A process in accordance with claim 2, wherein the oxygen-containing gas is chosen from the group consisting of air, mixtures of air and oxygen, and mixtures of oxygen and an inert gas.
4. A process in accordance with claim 1, wherein contacting the molten copper with the sulfur hexafluoride gas is accomplished by introducing said sulfur hexafluoride gas beneath the surface of the molten copper and allowing said sulfur hexafluoride gas to bubble through the molten copper.
5. A process in accordance with claim 4, wherein an oxygen-containing gas is introduced beneath the surface of the molten copper bath simultaneously with the introduction of the sulfur hexafluoride gas.
6. A process in accordance with claim 5, wherein the oxygen-containing gas is mixed with the sulfur hexafluoride gas and the mixture is then introduced beneath the surface of the molten copper.

* * * * *